United States Patent [19]

Nopanen

[11] 4,187,993
[45] Feb. 12, 1980

[54] FOOD GRINDER

[75] Inventor: Esko J. Nopanen, Asheboro, N.C.

[73] Assignee: General Electric Company, New York, N.Y.

[21] Appl. No.: 949,955

[22] Filed: Oct. 10, 1978

[51] Int. Cl.² ............................................. B02C 18/26
[52] U.S. Cl. ................................. 241/89.2; 241/89.3; 241/204; 241/205; 241/285 A
[58] Field of Search .................. 241/89.1, 89.2, 89.3, 241/242, 204, 205, 221, 285 R, 285 A, 285 B

[56] References Cited

U.S. PATENT DOCUMENTS

| | | | |
|---|---|---|---|
| 911,108 | 2/1909 | Beienburg | 241/89.3 |
| 2,327,725 | 8/1943 | London | 241/89.3 |
| 3,389,862 | 6/1968 | Schutte | 241/285 R X |

Primary Examiner—Mark Rosenbaum
Attorney, Agent, or Firm—John F. Cullen; George R. Powers; Leonard J. Platt

[57] ABSTRACT

A self-feeding and self-emptying food grinder is provided of a walled-hopper type with food receiving and bottom rectangular discharge openings. To this standard structure which may be mounted on a driving shaft, an improvement is provided that includes a foraminated outwardly directed convex grate enclosing and over the discharge opening and a driven cutter and move assembly transporting food from the hopper is provided with the assembly including a split drum smaller than and rotatably mounted off center in the discharge opening substantially along the parting line between the opening and grate, the drum being disposed to contact the grate on rotation at only one portion thereof. The drum is provided with diametrically opposite radially directed slots and a blade structure in the form of an open-centered frame is slidably mounted in the slots to alternately fully extend into the hopper and fully retract into the drum at the contact position of the drum and grate by the blade sliding along the grate on rotation. This forms a constantly decreasing space between the drum and grate on drum rotation whereby food is fed into and squeezed through the grate to empty the hopper. The entire structure is easily disassembled for cleaning and guide means is provided on the drum to fixedly locate the sliding cutter assembly.

5 Claims, 5 Drawing Figures

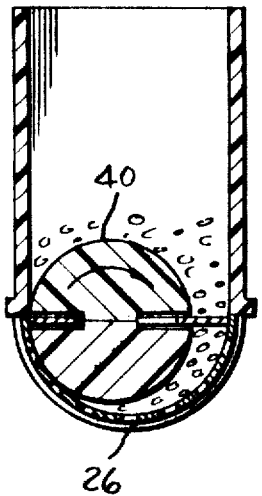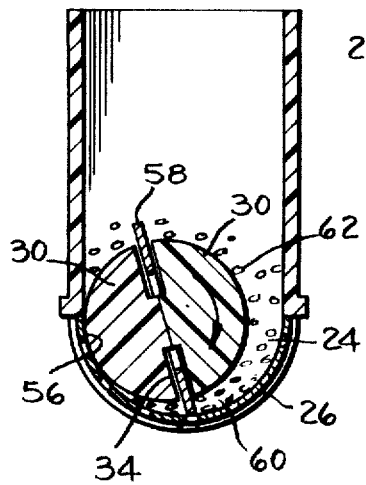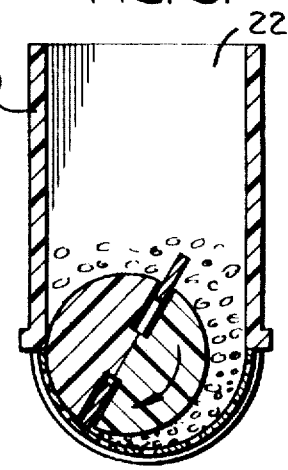

FOOD GRINDER

BACKGROUND OF THE INVENTION

1. Field of the Invention

The invention herein pertains to a self-feeding and self-emptying food grinder using a foraminated convex grate opening and a cutter structure that squeezes the food through the grate by pushing the food into a constantly decreasing space between a drum and the grate.

2. Description of the Prior Art

The concept of food grinders is very old varying from the standard old fashion conventional meat grinder that utilizes an auger to force food against a cutter and through a grate to various attachments for motor driven appliances such as mixers with meat grinder attachments that use either an auger or an alternate form of piston both of which move the food through an opening that may be closed with various sized screens depending on the fineness desired. The grinders may vary in size from small simple grinders for the home kitchen to large complex commercial grinders, both generally using the auger or piston principle. One of the main disadvantages of the auger type grinder is that a considerable amount of food remains in the grinder that will not feed through the cutter resulting in waste and generally difficult clean-up. The main disadvantage of the piston type grinder is that a large manual or motor force is needed to push foods through the cutter or exit screen. The present invention discloses a food grinder mechanism that eliminates the disadvantages of food remaining in the grinder, provides a fast, efficient process for grinding that is self-feeding and self-emptying, and which may be constructed in any size and is especially useful for making baby food from table food in a user's home.

SUMMARY OF THE INVENTION

Briefly described, the present invention is directed to a self-feeding and self-emptying food grinder of a conventional walled hopper type with food receiving and bottom discharge openings. To this known arrangement, an improvement is provided by making the bottom discharge opening in a rectangular form and closing it with a foraminated outwardly convex screen or grate that is attached to the hopper. A driven cutter and mover assembly transports the food through the hopper into a receptacle and the assembly comprises a longitudinally divided twopiece drum smaller than the discharge opening and rotatably mounted in the opening off-center of the grate curvature. The drum is disposed to contact the grate at only one portion thereof, preferably at one side of the hopper exit, and a radially slidable frame-like blade cutter is mounted in radially opposite slots in the drum to alternately fully extend into the hopper and fully retract into the drum at the contact portion by sliding along the grate as the drum rotates thus biasing the blade cutter back and forth through each 180 degrees of rotation so that a constantly decreasing space between the drum and grate is created on drum rotation which forces the food into and squeezes it through the grate to completely empty the hopper. The structure is arranged for easy disassembly and cleaning and is a lightweight attachment that may be used on any motor driven base such as may be provided by a standard can opener. Thus, the main object of the invention is to provide a simple self-feeding and self-emptying food grinder that leaves little or no residue, does not require a large force for operation, uses a constantly decreasing volume to generate a constantly increasing force to push food through the grate and completely empty the hopper, and which is easily disassembled for cleaning.

BRIEF DESCRIPTION OF THE DRAWINGS

FIGS. 3–5 are cross-sectional view of different drum positions illustrating the grinding action.

DESCRIPTION OF THE PREFERRED EMBODIMENT

The invention is described in connection with a simple attachment to any power source such as a can opener but is usable in a self-powered version or with other bases and may be made in any suitable size but is described for convenience as a small kitchen appliance.

Figure 1:
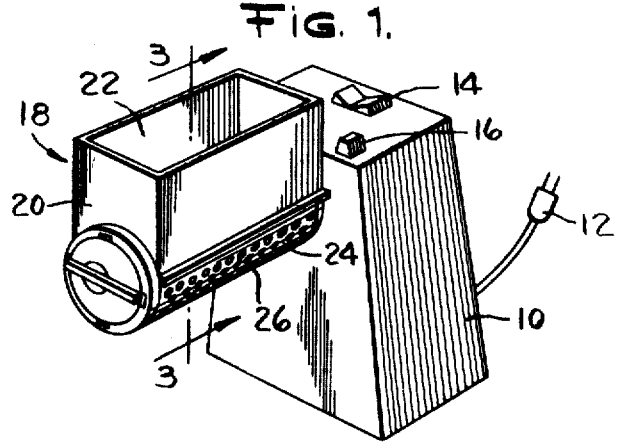
FIG. 1 is a perspective view of a typical food grinder as mounted on a standard can opener.

Referring first to FIG. 1, there is shown a power base 10 that may take any suitable form but, as shown, is a standard can opener electrically operated through cord 12 and actuated by on/off button 14. The can opener may have an additional latching structure forming no part of the present invention but which may be conventional and actuated by knob 16 to attach and detach a food grinder generally indicated at 18. Of course, grinder 18 will be suitably sized and oriented to provide a stable attachment and FIG. 1 is merely illustrative to show how the grinder may be conveniently powered.

Figure 2:
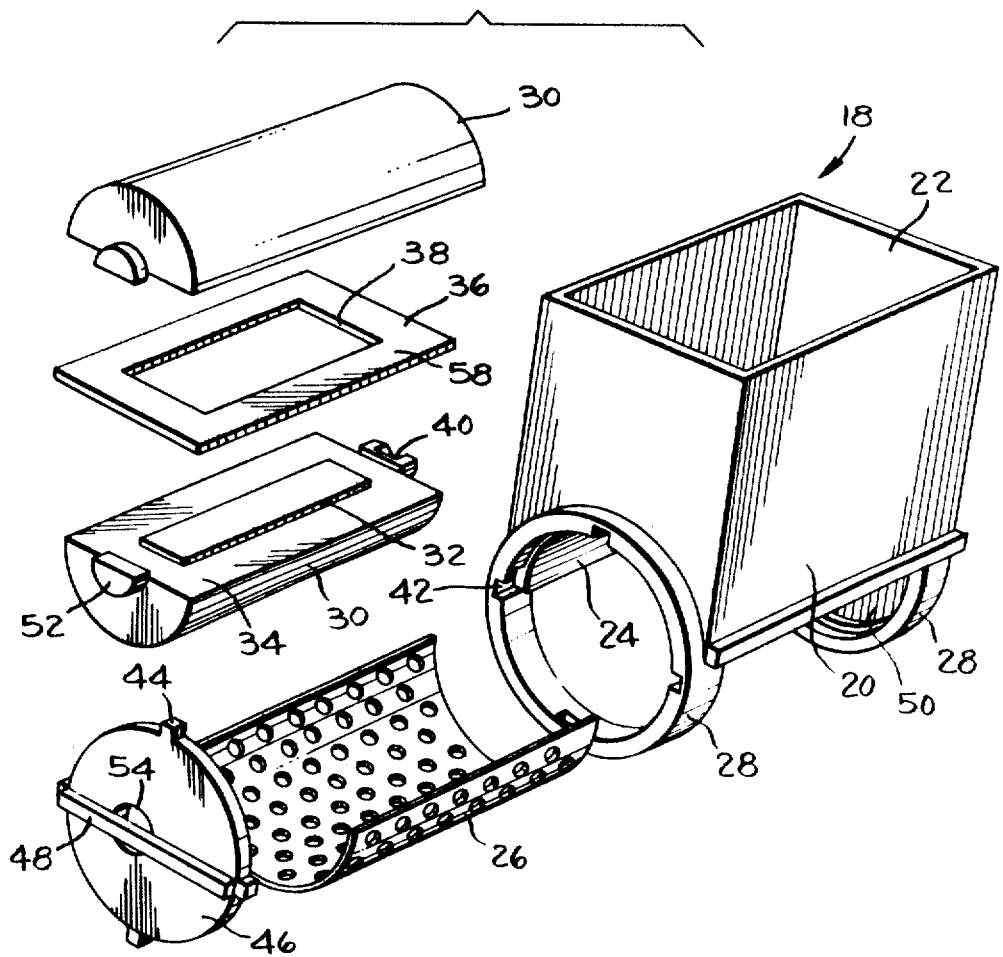
FIG. 2 is an exploded perspective view of the individual parts of the food grinder.

The food grinder comprising the present invention includes a walled hopper 20 of any suitable shape having a food receiving opening such as 22 shown at the top which may be covered or have a suitable funnel all as well known in the art. The food is intended to move through the hopper and out the bottom discharge opening 24 which, as shown, is preferably a rectangular opening that is enclosed by an outwardly extending convex foraminated grate 26 which may be one of several different size grates. As shown, the convex grate 26 is preferably a half-circular screen that may be pierced in any form desired. The grate or screen is secured to the hopper outlet by providing the hopper with circular hollow end rims 28 which are disposed wheel-like on opposite edges of discharge opening 24. The rims 28 may be hollow or the one adjacent power base 10 may be solid with suitable means for attachment to a driving shaft in the power base not shown. The rims 28 are designed to cradle grate 26 when it is pushed in endwise as apparent in FIG. 2. In order to transport the food through the hopper and the grate, cooperating therewith is a cutter and mover assembly that comprises a drum 30 which is split longitudinally into two halves as shown in FIG. 3 with at least one of the halves containing a raised embossed rectangular locator section 32 which, when meshed with the other half of the drum provides diametrically opposite radial slots 34 as shown in FIGS. 3–5. The slots may be formed by comparable raised matching sections 32 on each drum half as shown in FIGS. 3–5 or one portion of the drum may be flat or even have a recess to receive section 32 all being standard constructions. Fitting in the drum slots is a rectangular blade and mover frame 36 which has a central rectangular cut-out 38 larger in one direction than locator section 32 such that the frame 36 and locator 32 nest together so section 32 forms a guide for frame 36 to reciprocate in a radial direction only and slide in and out of the drum slots.

The cutter and mover assembly is held together by assembling the drum halves 30 to sandwich frame 36 therebetween and the drum is then slid into the already mounted grate 26 with an end connector 40 having a suitable driving niche to clutch with the driving shaft on power base 10 for rotating the drum. In order to secure the parts together and provide for easy support and disassembly, end rims 28 are provided with bayonet structure 42 which cooperates with lugs 44 on end cap means 46 so that the cap means 46 may be rotated by handle 48 to lock the end cap in end rims 28. Suitable recesses 50 in the end caps cup the grate 26 and hold it in position along the bottom cover discharge opening 24 substantially at the grate diameter. The assembled drum halves 30 and contained frame 36 are supported by the driven end connector 40 and a comparable supporting projection 52 fitting in opening 54 of cap 46 to form bearings supporting the drum for rotation.

In order to insure self-feeding and self-emptying, reference is made to FIGS. 3-5, wherein it will be seen cylindrical drum 40 is deliberately smaller in diameter than matching grate 26 and the cylindrical drum is disposed off-center in bottom discharge opening 24 supported by comparable off-center bearings such as opening 54 so that the drum contacts the grate tangentially only along a line at side portion 56 as the drum rotates when centered on the grate diameter as shown. As so assembled, it will be seen that the frame 36 is self-biased by the blades sliding along the grate as the drum rotates to alternately fully retract radially into the drum and fully extend from the radial drum slot so that each edge of the frame blade cutter extends and retracts 180 degrees out of phase with the opposite edge. Thus, each revolution of the drum results in two cycles of grinding action—one by each edge of the appropriate blade 58. With the assembly as described it will be seen that the sliding action of the blade edge 58 along the grate forms a constantly decreasing volume 60 between the drum and grate to feed the food 62 into the decreasing volume and squeeze it through the grate 26 to empty the hopper.

With the structure described, it can be seen that the driven cutter blade and mover assembly of drum 30 and frame 36 serves the function of both grasping capability to move a portion of the hopper's contents into position for grinding and then cutting the food into small pieces as the blade rubs across the grate by forcing the food through the grate as the size of the cutting volume 60 is gradually decreased to zero. Each half cycle of rotation of this cutter assembly processes the entire contents of the grinding compartment resulting in fast and efficient grinding. The food grinder provides a downward path for the food making it easier to catch as it leaves the grinder into any suitable receptacle. The horizontal drive shaft arrangement, by mounting on the side of power base 10, keeps any liquids from falling into the appropriate motor compartment. The entire device is easily disassembled by rotating end cap 46 whereby the drum cutter assembly and grate can slide out for easy cleaning. Separation of the drum permits cleaning of the blade and frame structure and, of course, many suitable different sized grates with various patterns can be used for different consistencies of grinding.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A self-feeding and self-emptying food grinder of a walled hopper with food receiving and bottom discharge openings, the improvement comprising,
   a removable foraminated half-circular convex grate enclosing said discharge opening,
   a driven cutter and mover assembly transporting food from the hopper,
   said assembly including a cylindrical drum of smaller diameter than said grate and rotatably mounted in the bottom discharge opening,
   said drum having removable closed end cap means and disposed to contact said grate at only one portion thereof,
   a radially slidable blade mounted in said drum to alternately fully extend into the hopper and fully retract into the drum at said contact portion by sliding along the grate,
   forming a constantly decreasing volume between the drum and grate on drum rotation to feed food into and squeeze it through said grate to empty the hopper.

2. Apparatus as described in claim 1 wherein said drum is split longitudinally in half and
   end means including said cap locking said halves together and in said hopper.

3. Apparatus as described in claim 2 wherein circular hollow end rims are disposed wheel-like on opposite edges of the discharge opening, and
   said grate and drum halves slide into and are supported by said rims and said end cap means are rotatable in a bayonet fastening with said rims.

4. Apparatus as described in claim 3 with a raised embossed locator section on at least one of said drum halves,
   said section forming a guide for nesting with said cutter and mover assembly frame.

5. Apparatus as described in claim 4 wherein said section is rectangular and said assembly frame has a rectangular larger matching cut-out to provide radial only sliding of said frame in the drum slots.

* * * * *